United States Patent
Hakola et al.

(10) Patent No.: US 8,934,393 B2
(45) Date of Patent: Jan. 13, 2015

(54) LOCAL SELECTION OF RETRANSMITTING DEVICE IN COOPERATIVE CLUSTER TO ENHANCE CELLULAR MULTICAST

(75) Inventors: Sami-Jukka Hakola, Kempele (FI); Timo Kalevi Koskela, Oulu (FI); Zhenhong Li, Shanghai (CN); Haifeng Wang, Shanghai (CN)

(73) Assignee: Nokia Corporation, Espoo (FI)

( * ) Notice: Subject to any disclaimer, the term of this patent is extended or adjusted under 35 U.S.C. 154(b) by 154 days.

(21) Appl. No.: 13/704,520

(22) PCT Filed: Jun. 17, 2010

(86) PCT No.: PCT/CN2010/074007
§ 371 (c)(1),
(2), (4) Date: Dec. 14, 2012

(87) PCT Pub. No.: WO2011/156958
PCT Pub. Date: Dec. 22, 2011

(65) Prior Publication Data
US 2013/0089020 A1  Apr. 11, 2013

(51) Int. Cl.
*H04H 20/71* (2008.01)
*H04L 1/18* (2006.01)
(Continued)

(52) U.S. Cl.
CPC ............ *H04W 4/06* (2013.01); *H04L 1/1867* (2013.01); *H04W 36/18* (2013.01); *H04W 24/04* (2013.01); *H04L 2001/0093* (2013.01); *H04W 72/005* (2013.01)
USPC ............................ 370/312; 370/310; 370/328

(58) Field of Classification Search
CPC ............... H04L 1/1867; H04L 2001/0093; H04W 72/005; H04W 4/06; H04W 24/04; H04W 36/18
See application file for complete search history.

(56) References Cited

U.S. PATENT DOCUMENTS

| 6,505,253 B1 | 1/2003 | Chiu et al. |
| 2008/0155148 A1 | 6/2008 | Oyman |
| 2009/0262678 A1* | 10/2009 | Oyman et al. ............... 370/315 |

FOREIGN PATENT DOCUMENTS

| CN | 101212285 A | 7/2008 |
| CN | 101282204 A | 10/2008 |

(Continued)

OTHER PUBLICATIONS

Zhang, et al., "Design and Performance Evaluation of Cooperative Retransmission Scheme for Reliable Multicast Services in Cellular Controlled P2P Networks", The 18th Annual IEEE International Symposium on Personal, Indoor and Mobile Radio Communications (PIMRC '07), 2007.

(Continued)

*Primary Examiner* — Jae Y Lee
(74) *Attorney, Agent, or Firm* — Mintz, Levin, Cohn, Ferris, Glovsky & Popeo, P.C.

(57) ABSTRACT

A method for local selection of a retransmitting user equipment within a cluster comprises: selecting first retransmission indication information according to a first pre-defined criterion, in response to receipt of non-acknowledgement information from at least one non-acknowledgement user equipment at which a data packet from a network node is decoded incorrectly; performing a local selection of a retransmitting user equipment within a cluster based at least in part on the first retransmission indication least one non-acknowledgement user equipment, and at least one acknowledgement user equipment at which the data packet is decoded correctly; and determining whether or not to retransmit the data packet to the at least one non-acknowledgement user equipment, based at least in part on the local selection of the retransmitting user equipment.

18 Claims, 7 Drawing Sheets

(51) Int. Cl.
*H04W 24/04* (2009.01)
*H04W 4/06* (2009.01)
*H04W 72/00* (2009.01)
*H04W 36/18* (2009.01)
*H04L 1/00* (2006.01)

(56) References Cited

FOREIGN PATENT DOCUMENTS

| | | |
|---|---|---|
| CN | 101304384 A | 11/2008 |
| JP | 2007266876 A | 10/2007 |
| WO | WO-2010007498 A1 | 1/2010 |
| WO | WO-2010034339 A1 | 4/2010 |

OTHER PUBLICATIONS

Sinkar, et al., "Cooperative Recovery in Heterogeneous Mobile Networks", 5th Annual IEEE Communications Society Converence on Sensor, Mesh and Ad Hoc Communications and Networks (SECON '08), 2008.

Doppler, et al., "Device-to-Device Communication as an underlay to LTE-Advanced Networks", IEEE Communications Magazine, Dec. 2009, vol. 47, issue 12.

PCT International Search Report dated Mar. 31, 2011, for PCT Application No. PCT/CN2010/074007.

Extended European Search Report dated Oct. 1, 2013 for corresponding European patent application No. 10853068.4.

\* cited by examiner

LOCAL SELECTION OF RETRANSMITTING DEVICE IN COOPERATIVE CLUSTER TO ENHANCE CELLULAR MULTICAST

RELATED APPLICATION

This application is a national stage application, filed under 35 U.S.C. §371, of PCT Application No. PCT/CN2010/074007, filed on Jun. 17, 2010, the contents of which are incorporated herein by reference in their entirety for all purposes.

FIELD OF THE INVENTION

The present invention generally relates to communication networks. More specifically, the invention relates to local selection of a retransmitting device in a cooperative cluster to enhance cellular multicast.

BACKGROUND

Integration of new network topologies into a cellular network gains more and more attraction and interest both in industry and academy of telecommunications. Good examples are, for example, current study item of heterogeneous networks (which is a deployment of macros, micros, picos, femtos and relays in the same spectrum) in Long Term Evolution (LTE)/LTE-A of the 3rd Generation Partnership Project (3GPP). One step further is to enable heterogeneous local communications directly among devices and machines under supervision of the network. Heterogeneous in local domain may include:

Network controlled device-to-device (D2D) communication including communication in the clusters of devices;
(Semi-)Autonomous D2D communication in a cellular network;
Grid/group of local machines communicating with each other while performing certain tasks in a cooperative way;
Advanced cellular device acting as a gateway for a bunch of low-capability devices or machines to access a network; and
Co-operative downloading or multicasting within a cluster of devices/machines.

In current cellular networks, a base station (BS), as a centralized controller, is the only access point for user equipments (UEs) such as mobile devices to the network service. Mobile devices can only communicate with a certain BS via the cellular uplink or downlink. However, enabling D2D direct communications when mobile devices are close to each other may offer many advantages, which comprise longer battery life, more efficient resource usage, coverage extension, lower interference level and so on. More recently, using the D2D technology in combination with cellular networks is becoming a promising concept. In such D2D enhanced cellular system, D2D direct communications could benefit from the centralized architecture of the cellular networks. In addition, the efficiency of the conventional cellular systems can be greatly improved by exploiting the higher channel quality of D2D direct links.

SUMMARY

The present description involves semi-autonomous D2D communications with limited evolved Node B (eNB) involvement into the resource allocation or, in general, semi-autonomous local heterogeneous communications without eNB direct involvement into the resource allocation and further control of the local communication taking place on uplink resources of the future cellular networks.

According to a first aspect of the present invention, there is provided a method comprising: selecting first retransmission indication information according to a first pre-defined criterion, in response to receipt of non-acknowledgement information from at least one non-acknowledgement user equipment at which a data packet from a network node is decoded incorrectly; performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly; and determining whether or not to retransmit the data packet to the at least one non-acknowledgement user equipment, based at least in part on the local selection of the retransmitting user equipment.

According to a second aspect of the present invention, there is provided an apparatus comprising: at least one processor; and at least one memory including computer program code, the at least one memory and the computer program code configured to, with the at least one processor, cause the apparatus to perform at least the following: selecting first retransmission indication information according to a first pre-defined criterion, in response to receipt of non-acknowledgement information from at least one non-acknowledgement user equipment at which a data packet from a network node is decoded incorrectly; performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly; and determining whether or not to retransmit the data packet to the at least one non-acknowledgement user equipment, based at least in part on the local selection of the retransmitting user equipment.

According to a third aspect of the present invention, there is provided a computer program product comprising a computer-readable medium bearing computer program code embodied therein for use with a computer, the computer program code comprising: code for selecting first retransmission indication information according to a first pre-defined criterion, in response to receipt of non-acknowledgement information from at least one non-acknowledgement user equipment at which a data packet from a network node is decoded incorrectly; code for performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly; and code for determining whether or not to retransmit the data packet to the at least one non-acknowledgement user equipment, based at least in part on the local selection of the retransmitting user equipment.

According to a fourth aspect of the present invention, there is provided an apparatus, comprising: selecting means for selecting first retransmission indication information according to a first pre-defined criterion, in response to receipt of non-acknowledgement information from at least one non-acknowledgement user equipment at which a data packet from a network node is decoded incorrectly; performing means for performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly; and determining means for determining whether or not to retransmit the data packet to the at least one non-acknowledgement user equipment, based at least in part on the local selection of the retransmitting user equipment.

In accordance with exemplary embodiments, said performing the local selection of the retransmitting user equipment within the cluster may comprise: transmitting the first retransmission indication information to the at least one non-acknowledgement user equipment; and receiving second retransmission indication information from each of the at least one non-acknowledgement user equipment. For example, the second retransmission indication information may be selected according to a second pre-defined criterion by the non-acknowledgement user equipment among respective retransmission indication information received from the at least one acknowledgement user equipment, and the respective retransmission indication information comprising the first retransmission indication information may be selected by the at least one acknowledgement user equipment according to the first pre-defined criterion.

According to an exemplary embodiment, said determining whether or not to retransmit the data packet to the at least one non-acknowledgement user equipment based at least in part on the local selection of the retransmitting user equipment may comprise: determining to retransmit the data packet to the at least one non-acknowledgement user equipment, if the first retransmission indication information matches with the second retransmission indication information. For example, the retransmitting user equipment may send information to the network node to indicate that the retransmission is needed.

In accordance with exemplary embodiments, said performing the local selection of the retransmitting user equipment within the cluster may comprise: collecting, as a pre-defined acknowledgement user equipment, respective retransmission indication information from the at least one acknowledgement user equipment, wherein the respective retransmission indication information comprising the first retransmission indication information is selected by the at least one acknowledgement user equipment according to the first pre-defined criterion; selecting second retransmission indication information among the respective retransmission indication information, according to a second pre-defined criterion; and reporting the second retransmission indication information to the network node, wherein an acknowledgement user equipment of which the selected retransmission indication information according to the first pre-defined criterion matches with the second retransmission indication information is the retransmitting user equipment.

In accordance with exemplary embodiments, said performing the local selection of the retransmitting user equipment within the cluster may comprise: sending the first retransmission indication information to a pre-defined acknowledgement user equipment; and listening a retransmission decision signaled by the pre-defined acknowledgement user equipment. For example, the pre-defined acknowledgement user equipment may collect respective retransmission indication information from the at least one acknowledgement user equipment, and the respective retransmission indication information comprising the first retransmission indication information may be selected by the at least one acknowledgement user equipment according to the first pre-defined criterion.

According to an exemplary embodiment, the retransmission decision may comprise at least second retransmission indication information which may be selected according to a second pre-defined criterion by the pre-defined acknowledgement user equipment among the respective retransmission indication information. Thus, an acknowledgement user equipment of which the selected retransmission indication information according to the first pre-defined criterion matches with the second retransmission indication information is the retransmitting user equipment. According to another exemplary embodiment, the retransmission decision may comprise at least an identifier of the retransmitting user equipment. For example, the identifier of the retransmitting user equipment may be transmitted by the pre-defined acknowledgement user equipment to the network node or within the cluster.

According to an exemplary embodiment, the pre-defined acknowledgement user equipment may be specified from the at least one acknowledgement user equipment according to its respective pre-ordering identifier within the cluster. For example, the pre-defined acknowledgement user equipment may have the highest/lowest pre-ordering identifier within the cluster. Optionally, the network node may send a scheduling made for the intra-cluster retransmission to each of user equipments within the cluster.

According to an exemplary embodiment, for each of the at least one acknowledgement user equipment, the respective retransmission indication information may comprise the worst one of channel quality metrics (such as the worst modulation and coding scheme) evaluated for all of the at least one non-acknowledgement user equipment, and wherein the second retransmission indication information comprises the best one of said worst channel quality metrics (such as the best modulation and coding scheme).

According to a fifth aspect of the present invention, there is provided a method, comprising: sending non-acknowledgement information to at least one acknowledgement user equipment at which a data packet from a network node is decoded correctly; receiving first retransmission indication information from each of the at least one acknowledgement user equipment, wherein the first retransmission indication information is selected by each of the at least one acknowledgement user equipment according to a first pre-defined criterion; and performing a local selection of a retransmitting user equipment within a cluster based at least in part on the first retransmission indication information, wherein the cluster comprises the at least one acknowledgement user equipment, and at least one non-acknowledgement user equipment at which the data packet is decoded incorrectly.

According to a sixth aspect of the present invention, there is provided an apparatus, comprising: at least one processor; and at least one memory including computer program code, the at least one memory and the computer program code configured to, with the at least one processor, cause the apparatus to perform at least the following: sending non-acknowledgement information to at least one acknowledgement user equipment at which a data packet from a network node is decoded correctly; receiving first retransmission indication information from each of the at least one acknowledgement user equipment, wherein the first retransmission indication information is selected by each of the at least one acknowledgement user equipment according to a first pre-defined criterion; and performing a local selection of a retransmitting user equipment within a cluster based at least in part on the first retransmission indication information, wherein the cluster comprises the at least one acknowledgement user equipment, and at least one non-acknowledgement user equipment at which the data packet is decoded incorrectly.

According to a seventh aspect of the present invention, there is provided a computer program product comprising a computer-readable medium bearing computer program code embodied therein for use with a computer, the computer program code comprising: code for sending non-acknowledgement information to at least one acknowledgement user equipment at which a data packet from a network node is decoded correctly; code for receiving first retransmission indication information from each of the at least one acknowledgement user equipment, wherein the first retransmission indication information is selected by each of the at least one acknowledgement user equipment according to a first pre-defined criterion; and code for performing a local selection of a retransmitting user equipment within a cluster based at least in part on the first retransmission indication information, wherein the cluster comprises the at least one acknowledgement user equipment, and at least one non-acknowledgement user equipment at which the data packet is decoded incorrectly.

According to an eighth aspect of the present invention, there is provided an apparatus, comprising: sending means for sending non-acknowledgement information to at least one acknowledgement user equipment at which a data packet from a network node is decoded correctly; receiving means for receiving first retransmission indication information from each of the at least one acknowledgement user equipment, wherein the first retransmission indication information is selected by the at least one acknowledgement user equipment according to a first pre-defined criterion; and performing means for performing a local selection of a retransmitting user equipment within a cluster based at least in part on the first retransmission indication information, wherein the cluster comprises the at least one acknowledgement user equipment, and at least one non-acknowledgement user equipment at which the data packet is decoded incorrectly.

According to exemplary embodiments, said performing the local selection of the retransmitting user equipment within the cluster may comprise: selecting, among the received first retransmission indication information, second retransmission indication information according to a second pre-defined criterion; and transmitting the second retransmission indication information to the at least one acknowledgement user equipment, wherein an acknowledgement user equipment of which the first retransmission indication information matches with the second retransmission indication information is the retransmitting user equipment.

According to a ninth aspect of the present invention, there is provided a method, comprising: sending a data packet to each of user equipments within a cluster, wherein the cluster comprises at least one acknowledgement user equipment at which the data packet is decoded correctly, and at least one non-acknowledgement user equipment at which the data packet is decoded incorrectly; and receiving, from one of the at least one acknowledgement user equipment, indication information which indicates an intra-cluster retransmission, wherein a selection of a retransmitting user equipment which performs the intra-cluster retransmission is made within the cluster locally.

According to a tenth aspect of the present invention, there is provided an apparatus, comprising: at least one processor; and at least one memory including computer program code, the at least one memory and the computer program code configured to, with the at least one processor, cause the apparatus to perform at least the following: sending a data packet to each of user equipments within a cluster, wherein the cluster comprises at least one acknowledgement user equipment at which the data packet is decoded correctly, and at least one non-acknowledgement user equipment at which the data packet is decoded incorrectly; and receiving, from one of the at least one acknowledgement user equipment, indication information which indicates an intra-cluster retransmission, wherein a selection of a retransmitting user equipment which performs the intra-cluster retransmission is made within the cluster locally.

According to an eleventh aspect of the present invention, there is provided a computer program product comprising a computer-readable medium bearing computer program code embodied therein for use with a computer, the computer program code comprising: code for sending a data packet to each of user equipments within a cluster, wherein the cluster comprises at least one acknowledgement user equipment at which the data packet is decoded correctly, and at least one non-acknowledgement user equipment at which the data packet is decoded incorrectly; and code for receiving, from one of the at least one acknowledgement user equipment, indication information which indicates an intra-cluster retransmission, wherein a selection of a retransmitting user equipment which performs the intra-cluster retransmission is made within the cluster locally.

According to a twelfth aspect of the present invention, there is provided an apparatus, comprising: sending means for sending a data packet to each of user equipments within a cluster, wherein the cluster comprises at least one acknowledgement user equipment at which the data packet is decoded correctly, and at least one non-acknowledgement user equipment at which the data packet is decoded incorrectly; and receiving means for receiving, from one of the at least one acknowledgement user equipment, indication information which indicates an intra-cluster retransmission, wherein a selection of a retransmitting user equipment which performs the intra-cluster retransmission is made within the cluster locally.

According to exemplary embodiments, the indication information may be sent from one of the retransmitting user equipment and a pre-defined user equipment. For example, if the indication information is sent from the pre-defined user equipment, the indication information may comprise at least a channel quality metric for the intra-cluster retransmission. In this case, the indication information may further comprise an identifier of the retransmitting user equipment. Optionally, the network node may send a scheduling made for the intra-cluster retransmission to each of the user equipments within the cluster, if the indication information is sent from the pre-defined user equipment.

In exemplary embodiments of the present invention, the provided methods, apparatus, user equipments, network nodes and computer program products can efficiently make selection of retransmitting devices locally within the cluster without involvement of the network node for evaluating the channel qualities between cluster devices and the selection process. Moreover, the solution of the present invention can reduce scheduler complexity and decrease power consumption of the cluster members.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Figure 1:
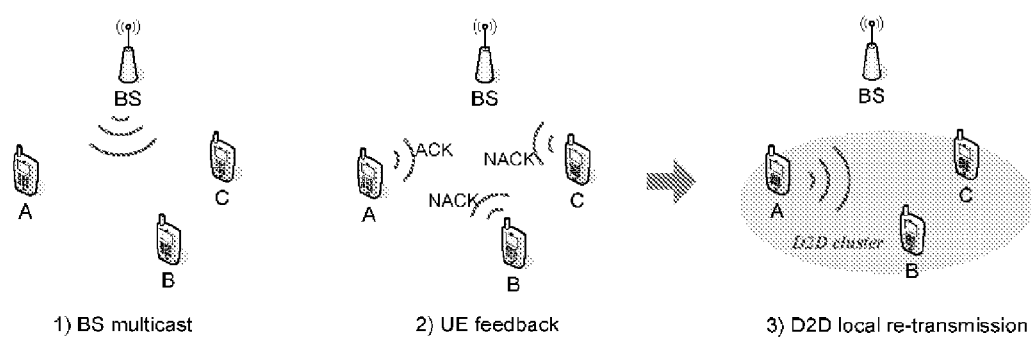
FIG. 1 is a diagram exemplarily illustrating the D2D enhanced cellular downlink multicast.

An exemplary system is presented in FIG. 1 where the cellular downlink multicast/broadcast is enhanced by additional D2D direct communications among UEs/mobile devices. As shown in FIG. 1, several cellular mobile devices (for example, UE A, UE B and UE C denoted in FIG. 1) in the proximity of each other form a D2D cluster. Members of the D2D cluster are capable of communicating directly with each other. All the devices of this D2D cluster are interested in downloading the same data file from the cellular network. For this reason, the BS sends the same transport block to all the devices of the D2D cluster simultaneously by multicasting. Due to the independent fading of the downlink channels, some UEs/devices of D2D cluster (such as UE A, which are defined as ACK UEs/devices herein), can decode the transport block successfully whereas others (such as UE B and UE C, which are defined as NACK UEs/devices herein) may not. To allow ACK devices to retransmit the current transport block to NACK devices over D2D direct links can increase the efficiency of cellular radio resource usage and also reduce the system delay. Here it is assumed that the radio resource for intra-cluster D2D communications, for example retransmissions, is guaranteed by the BS from the resource for the main cellular system operation, and the orthogonal resource usage of D2D and cellular communications may be provided.

One approach of enabling the intra-cluster D2D retransmission is that all of the ACK devices in a cluster participate in the D2D local retransmission by sending the same data on the same resource. However, so many devices participate in the D2D local retransmission is a waste of resource and battery life. In addition, it is very hard to design a good link adaptation for the D2D retransmission in this scheme because Channel Quality Information (CQI) of links connecting all ACK devices and all NACK devices should be feedback to the BS, which is a heavy burden of the system.

Another approach is to assign one pre-defined device (for instance, a cluster head) for the D2D local retransmission by multicasting. A problem may occur when the cluster head is a NACK device and fails to receive the current transport block. Further, in order to ensure the correct decoding at every NACK device, Modulation and Coding Scheme (MCS) of D2D retransmission should be selected based on the worst link between the cluster header and all the NACK devices. Sometimes, only one bad D2D link in the cluster could severely bottleneck the throughput of D2D retransmission. That is also a waste of resource.

In addition, a system, where NACK devices transmit pilot signals within a D2D cluster on the pre-defined orthogonal resources, and all the ACK devices listen and receive these pilot signals, may be provided. From the received pilot signals, ACK devices can form a channel quality metric between itself and each NACK device (assuming full connectivity of the D2D cluster). Also ACK devices can know which members of the cluster are NACK devices. Then ACK devices signal all this information to a BS/eNB that then decides which ACK device(s) should perform a retransmission for a certain packet locally within the cluster. This approach introduces the extra delay and processing at the eNB, and additional scheduler complexity (D2D retransmissions in the clusters need to be scheduled in a very fast manner, in addition to time-frequency-spatial domain scheduling of cellular users). Moreover, a relatively high feedback bandwidth is needed to convey information from the cluster to the eNB.

Thus there is a need to design a D2D retransmission scheme with limited feedback and signaling, in order to efficiently use radio resources for the aforementioned D2D local retransmissions. It is desirable to design a scheme in which the selection of retransmitting ACK UEs/devices is done locally within a cluster without involvement of an eNB/BS for evaluating the channel qualities between cluster devices and the selection process.

Figure 2:
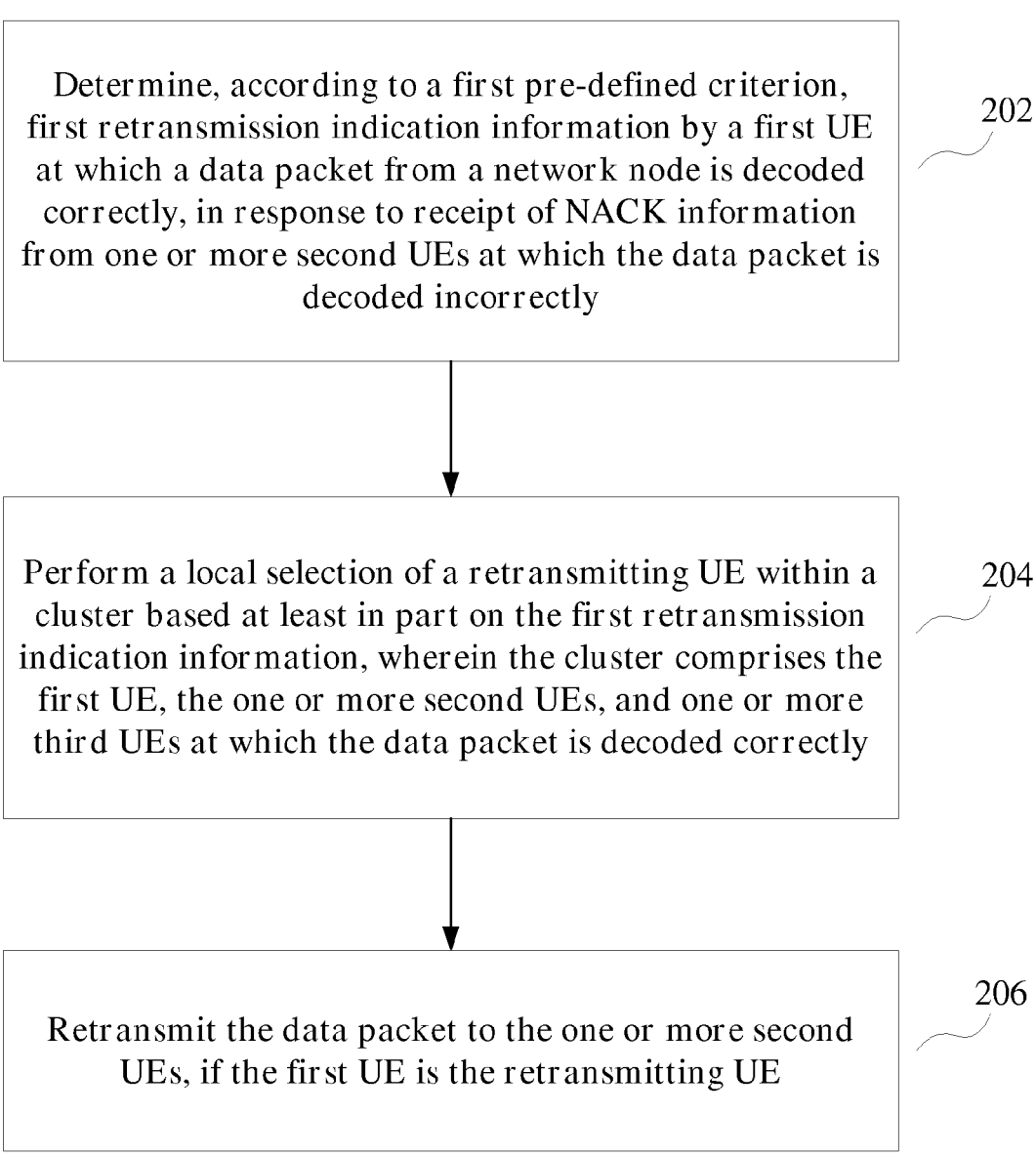
FIG. 2 is a flowchart illustrating a method for local selection of a retransmitting UE in a cluster which may be implemented at an acknowledgement (ACK) UE in accordance with embodiments of the present invention.

FIG. 2 is a flowchart illustrating a method for local selection of a retransmitting UE in a cluster which may be implemented at an ACK UE in accordance with embodiments of the present invention. In a communication network comprising a network node and one or more UEs, the network node (such as a BS/eNB/control center) may send a data packet to all the UEs (such as mobile devices, wireless terminals) within a cluster. Here full connectivity is assumed in the cluster. All devices are in the radio range of each other and are able to communicate. As mentioned above, some devices (such as ACK UEs) of the cluster may decode the data packet correctly whereas others (such as NACK UEs) may not. The method illustrated in FIG. 2 describes operations of an ACK UE in a process for local selection of a retransmitting UE in a cluster.

In block 202, an ACK UE may select first retransmission indication information according to a first pre-defined criterion, in response to receipt of NACK information from at least one NACK UE at which a data packet from a network node is decoded incorrectly. In an exemplary embodiment, the ACK UE may evaluate qualities of links with the at least one NACK UE, and translate the qualities to channel quality metrics (such as MCSs), so as to select one channel quality metric from these channel quality metrics according to the first pre-defined criterion. Particularly, for each of the at least one ACK UE, the selected retransmission indication information may comprise the worst one (such as the minimal MCS) of channel quality metrics evaluated for all of the at least one NACK UE, and the second retransmission indication information may comprise the best one (such as the maximal MCS) of these worst channel quality metrics.

Based at least in part on the first retransmission indication information, the ACK UE may perform a local selection of a retransmitting UE within a cluster, as shown in block 204. For example, the cluster may comprise the at least one NACK, and at least one ACK UE at which the data packet is decoded correctly. Then based at least in part on the local selection of the retransmitting UE, as shown in block 206, the ACK UE may determine whether or not to retransmit the data packet to the at least one NACK. According to exemplary embodiments, the ACK UE may perform the local selection of the retransmitting UE within the cluster according to different schemes.

In exemplary embodiments for Scheme A, when performing the local selection of the retransmitting UE within the cluster, the ACK UE may transmit the first retransmission indication information to the at least one NACK UE, and receive second retransmission indication information from each of the at least one NACK UE. For example, the second retransmission indication information may be selected according to a second pre-defined criterion by the NACK UE among respective retransmission indication information received from the at least one ACK UE, and the respective retransmission indication information comprising the first retransmission indication information may be selected by the at least one ACK UE according to the first pre-defined criterion. As an example, the ACK UE may determine to retransmit the data packet to the at least one NACK UE, if the first retransmission indication information matches with the second retransmission indication information. In Scheme A, the retransmitting UE may send information (for example, one bit information) to the network node to indicate that the retransmission is needed.

As an example for Scheme A, ACK devices may select and transmit the worst MCS/channel quality metric they can detect to NACK devices on their dedicated frequency/time resources. Specifically, these ACK devices evaluate the link qualities to NACK devices and may translate the link qualities to pre-defined channel quality metrics (for example, pre-defined MCSs). Each ACK device selects the worst MCS and broadcasts it to NACK devices in a specific resource. Devices in the cluster have been assigned dedicated resource for such transmissions. After receiving the respective MCSs selected by the ACK devices, NACK devices select the best MCS and send it back to the ACK devices. Specifically, NACK devices listen to the simultaneous transmissions of all the ACK devices, and then select the best MCS and transmit the value simultaneously to the ACK devices. As an example, ACK devices may compare the selected MCS of the NACK devices to their own transmitted MCS and prepare to retransmit the data packet locally if they match. If the MCS selected by NACK devices matches with the respective MCSs transmitted by multiple ACK devices, then the retransmission is made by the multiple ACK devices. In addition, the selected ACK device may signal NACK (for example, one bit information) to the eNB to indicate that the retransmission is needed.

In exemplary embodiments for Scheme B, an ACK UE which is able to collect retransmission indication information from all ACK UEs and select the retransmitting ACK UE may be pre-defined. The pre-defined ACK UE may be specified from the ACK UEs according to their respective pre-ordering identifiers within the cluster. For example, the ACK UE with highest (or worst) order identifier (ID) may be specified as the pre-defined ACK UE.

According to Scheme B, when performing the local selection of the retransmitting UE within the cluster, the pre-defined ACK UE may collect respective retransmission indication information from the at least one ACK UE. For example, the respective retransmission indication information comprising the first retransmission indication information may be selected by the at least one ACK UE according to the first pre-defined criterion. Then, the pre-defined ACK UE may select second retransmission indication information among the respective retransmission indication information according to a second pre-defined criterion, and report the second retransmission indication information to the network node. In this case, an ACK UE of which the selected retransmission indication information according to the first pre-defined criterion matches with the second retransmission indication information is the retransmitting UE.

For the ACK UE which is not the pre-defined ACK UE, when performing the local selection of the retransmitting UE within the cluster, this ACK UE may send the first retransmission indication information to the pre-defined ACK UE, and listen a retransmission decision signaled by the pre-defined ACK UE. As described above, the pre-defined ACK UE may collect respective retransmission indication information from the at least one ACK UE, and the respective retransmission indication information comprising the first retransmission indication information may be selected by the at least one ACK UE according to the first pre-defined criterion.

In an exemplary embodiment, the retransmission decision may comprise at least second retransmission indication information which may be selected according to a second pre-defined criterion by the pre-defined ACK UE among the respective retransmission indication information. An ACK UE of which the selected retransmission indication information according to the first pre-defined criterion matches with the second retransmission indication information is the retransmitting UE.

Alternatively or additionally, the retransmission decision may comprise at least an identifier of the retransmitting UE. In an exemplary embodiment, if the second retransmission indication information corresponds to more than one possible retransmitting UE, the pre-defined ACK UE may specify one of them as the retransmitting UE, according to a pre-determined criterion. For example, the one with lowest pre-ordering ID among these possible retransmitting UE may be selected as the actual retransmitting UE. The identifier of the selected retransmitting UE may be transmitted by the pre-defined ACK UE to the network node or within the cluster. In another embodiment, the pre-defined ACK UE may not specify a certain retransmitting UE, even if there are several possible retransmitting UE correspond to the second retransmission indication information, because the listening ACK UE can determine whether it is the retransmitting UE by comparing the second retransmission indication information with its selected retransmission indication information. Optionally, the network node may send a scheduling made for the intra-cluster retransmission to each of UEs within the cluster, before initiation of the intra-cluster retransmission.

As an example for Scheme B, according to the pre-ordering within the D2D cluster, a D2D UE is aware of its order within the cluster after receiving NACK UEs' broadcasting signals. Therefore the receiving ACK UE (which is also referred as the pre-defined ACK UE) can be pre-defined dynamically. The ACK UE's MCS transmission order could be defined such that ACK UEs with lower order identifiers (ID) transmit channel quality metrics to the ACK UE with highest order ID or vice versa. After rest of the ACK devices select and transmit the worst MCS/channel quality metric to a pre-defined ACK device on the dedicated physical resource (such as time, frequency, code and etc.), the pre-defined ACK UE, who receives all the MCSs from the rest of the ACK UEs, can make decision on which ACK UE(s) may retransmit the packet within the cluster, and send the decision to the eNB. Some possible options for communicating the decision are presented below:

Option 1: When the pre-defined ACK UE is transmitting the final MCS to the eNB, rest of UEs are listening. If the transmitted MCS in the cellular link is the same as an ACK UE's worst MCS, this ACK UE makes the retransmission within the cluster. In this case, one or more ACK UEs may make the retransmission within the cluster;

Option 2: When the pre-defined ACK UE is transmitting the final MCS and the retransmitting ACK UE's ID to the eNB, rest of UEs are listening. In this case, only one ACK UE may make the retransmission within the cluster;

Option 3: The pre-defined ACK UE broadcasts the retransmitting ACK UE's ID within the cluster. In this case, one more time interval for intra-cluster broadcasting is needed and only one ACK UE may make the retransmission within the cluster.

According exemplary embodiments, if the radio resource for the D2D communication has been pre-reserved by the eNB, the pre-defined ACK UE only needs to send an intra-cluster retransmission indicator to the eNB. Optionally, when the eNB receives the MCS from the pre-defined ACK UE, the eNB may make the proper scheduling for the D2D retransmission and send the scheduling grant to each D2D UE. Then one or more retransmitting ACK UEs may make the intra-cluster retransmission.

Figure 3:
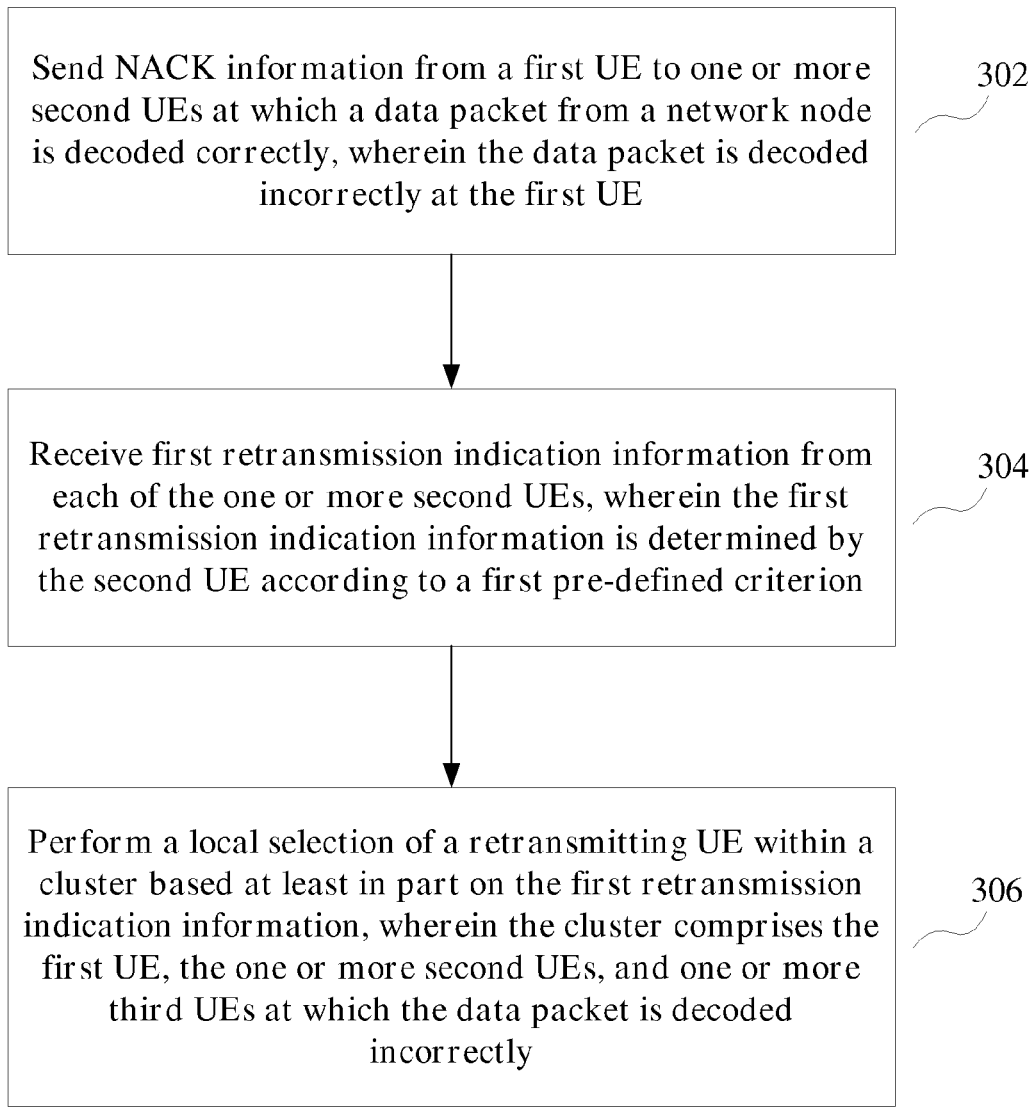
FIG. 3 is a flowchart illustrating a method for local selection of a retransmitting UE in a cluster which may be implemented at a non-acknowledgement (NACK) UE in accordance with embodiments of the present invention.

Reference is now made to FIG. 3, which is a flowchart illustrating a method for local selection of a retransmitting UE in a cluster which may be implemented at a NACK UE in accordance with embodiments of the present invention. In case that a data packet received from the network node is decoded incorrectly, the NACK UE may send NACK information to at least one ACK UE at which the data packet is decoded correctly, as shown in block 302. For example, when Scheme A is employed for the local selection of a retransmitting UE, the determination of the retransmitting UE may involve NACK UEs in the cluster. In this case, the NACK UE may receive first retransmission indication information from each of the at least one ACK UE, as shown in block 304. For example, the first retransmission indication information may be selected by each of the at least one ACK UE according to a first pre-defined criterion. Based at least in part on the first retransmission indication information, in block 306, the NACK UE may perform a local selection of a retransmitting UE within a cluster which may comprise the at least one ACK UE and at least one NACK UE.

According to exemplary embodiments, when performing the local selection of the retransmitting UE within the cluster, the NACK UE may select, among the received first retransmission indication information, second retransmission indication information according to a second pre-defined criterion. Similar to the description of FIG. 2, for example, for the ACK UE, the first retransmission indication information may comprise the worst one (such as MCSmin) of channel quality metrics evaluated for all the NACK UEs. Upon receiving respective first retransmission indication information from all the ACK UEs, the NACK UE may select the second retransmission indication information, for example the best one (such as MCSmax) of the received worst channel quality metrics, and transmit the second retransmission indication information to the at least one ACK UE. Thus, an ACK UE of which the first retransmission indication information matches with the second retransmission indication information is the retransmitting UE. It can be realized that there may be one or more retransmitting UEs for the intra-cluster D2D retransmission. Then the NACK UE may receive the data packet from the retransmitting UE locally.

Figure 4:
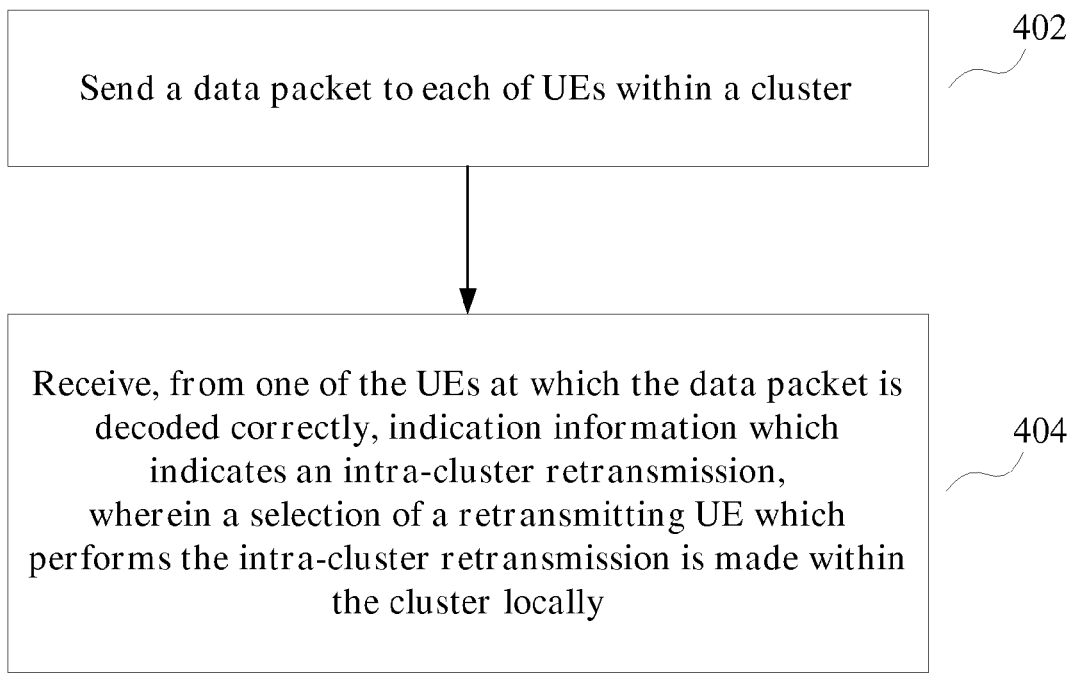
FIG. 4 is a flowchart illustrating a method for local selection of a retransmitting UE in a cluster which may be implemented at a network node in accordance with embodiments of the present invention.

Correspondingly, FIG. 4 is a flowchart illustrating a method for local selection of a retransmitting UE in a cluster which may be implemented at a network node in accordance with embodiments of the present invention. A network node such as a BS/eNB/control center may send a data packet to each of UEs within a cluster, as shown in block 402. As mentioned previously, the cluster may comprise several UEs, and some of them (ACK UEs) may decode the data packet correctly, while others (NACK UEs) may not. In case that a selection of a retransmitting UE which performs the intra-cluster retransmission is made within the cluster locally, the network node may receive, from one of ACK UE, indication information which indicates an intra-cluster retransmission, as shown in block 404. For example, the indication information may be sent from one of the retransmitting UE and a pre-defined UE. If the indication information is sent from the pre-defined UE, the indication information may comprise at least a channel quality metric (such as MCS) for the intra-cluster retransmission. In this case, the indication information may further comprise an identifier of the retransmitting UE. Upon receiving the indication information from the pre-defined UE, the network node may send a scheduling made for the intra-cluster retransmission to each of the UEs within the cluster, according to an exemplary embodiment.

The various blocks shown in FIGS. 2-4 may be viewed as method steps, and/or as operations that result from operation of computer program code, and/or as a plurality of coupled logic circuit elements constructed to carry out the associated function(s). The solution provided by the present invention enables the retransmission of the missed packet by some cluster members to be organized and performed autonomously within the cluster (selection of the retransmitter) with relatively small amount of signaling required between the cluster and the eNB. Moreover, such solution can reduce scheduler complexity and decrease power consumption of the cluster members.

Figure 5:
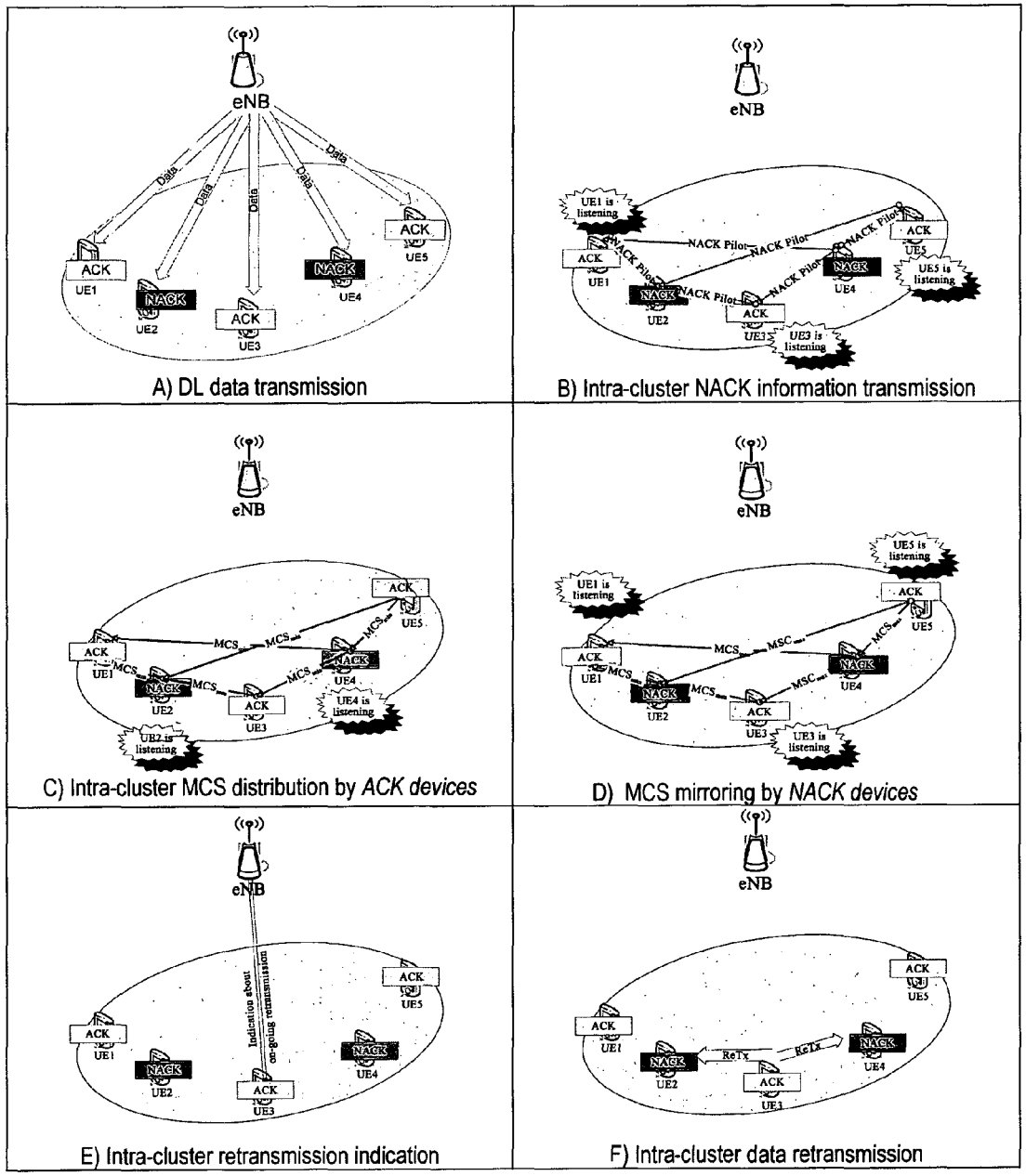
FIG. 5 shows schematically implementation of Scheme A for local selection of a retransmitting UE in a cluster in accordance with embodiments of the present invention.

FIG. 5 shows schematically implementation of Scheme A for local selection of a retransmitting UE in a cluster in accordance with an embodiment of the present invention. The communication system such as a cellular network shown in FIG. 5 may comprise one or more network nodes such as a BS/eNB or an access point (AP) as a centralized controller, as well as one or more UEs such as mobile devices and wireless terminals. The UEs within the coverage of an eNB can access services provided by the eNB, for example, downloading data file, receiving multimedia data packet, and etc. For simplicity, FIG. 5 and FIG. 6 only show one eNB and five UEs (UE1-UE5) within a D2D cluster. These five UEs are served by the eNB. It can be realized that the eNB may serve more UEs, and there may be more eNBs located in the communication network.

As shown in block A) of FIG. 5, the eNB may send a data packet to all the UEs (UE1-UE5) within the cluster. Every UE detects the data packet and decides the ACK/NACK based on decision criteria, for example, Cycling Redundancy Check (CRC) bits. If all the UEs can decode the data packet correctly, i.e. "all ACK", which means all the UEs are ACK UEs, then each ACK UE waits for a pre-defined time interval and receives nothing. In this case, one ACK UE can report to the eNB with "a null MCS", for example. Then the eNB may make a new transmission for a corresponding Hybrid Automatic Repeat Request (HARQ) process. If all the UEs decode the data packet incorrectly, i.e., "all NACK", which means all the UEs are NACK UEs, then the eNB waits for a pre-defined time interval and receives nothing. In this case, the eNB may make the retransmission of this data packet.

Generally, some of the UEs may decode the data packet correctly and others may not. In this circumstance, NACK UEs such as UE2 and UE4 may send dedicated NACK information (or probing like signaling) to ACK UEs such as UE1, UE3 and UE5, as shown in block B) of FIG. 5. According to Scheme A, UE1, UE3 and UE5 may select and transmit their respective worst MCS/channel quality metric (for example, MCSmin) they can detect to NACK devices (UE2 and UE4) on their dedicated frequency/time resources, as shown in block C) of FIG. 5. In response to receipt of the worst MCS/channel quality metrics from UE1, UE3 and UE5, as shown in block D) of FIG. 5, UE2 and UE4 may select the best MCS transmitted by the ACK devices (UE1, UE3 and UE5) and send the selected MCS (for example, MCSmax) back to the UE1, UE3 and UE5. ACK devices may compare the selected MCS of the NACK devices to their own transmitted MCS. If the MCS selected by NACK devices matches with the transmitted one, the ACK device may be a retransmitter which makes a D2D retransmission in the cluster. It is noted that the retransmission may be made by multiple devices. After MCS mirroring by NACK devices, the selected device may signal NACK (for example, one bit information) to the eNB to indicate that the retransmission is needed, as shown in block E) of FIG. 5. Assuming the best MCS detected and mirrored back by UE2 and U4 corresponds to the MCS of UE3, UE3 may do the retransmission locally as shown in block F) of FIG. 5.

Figure 6:
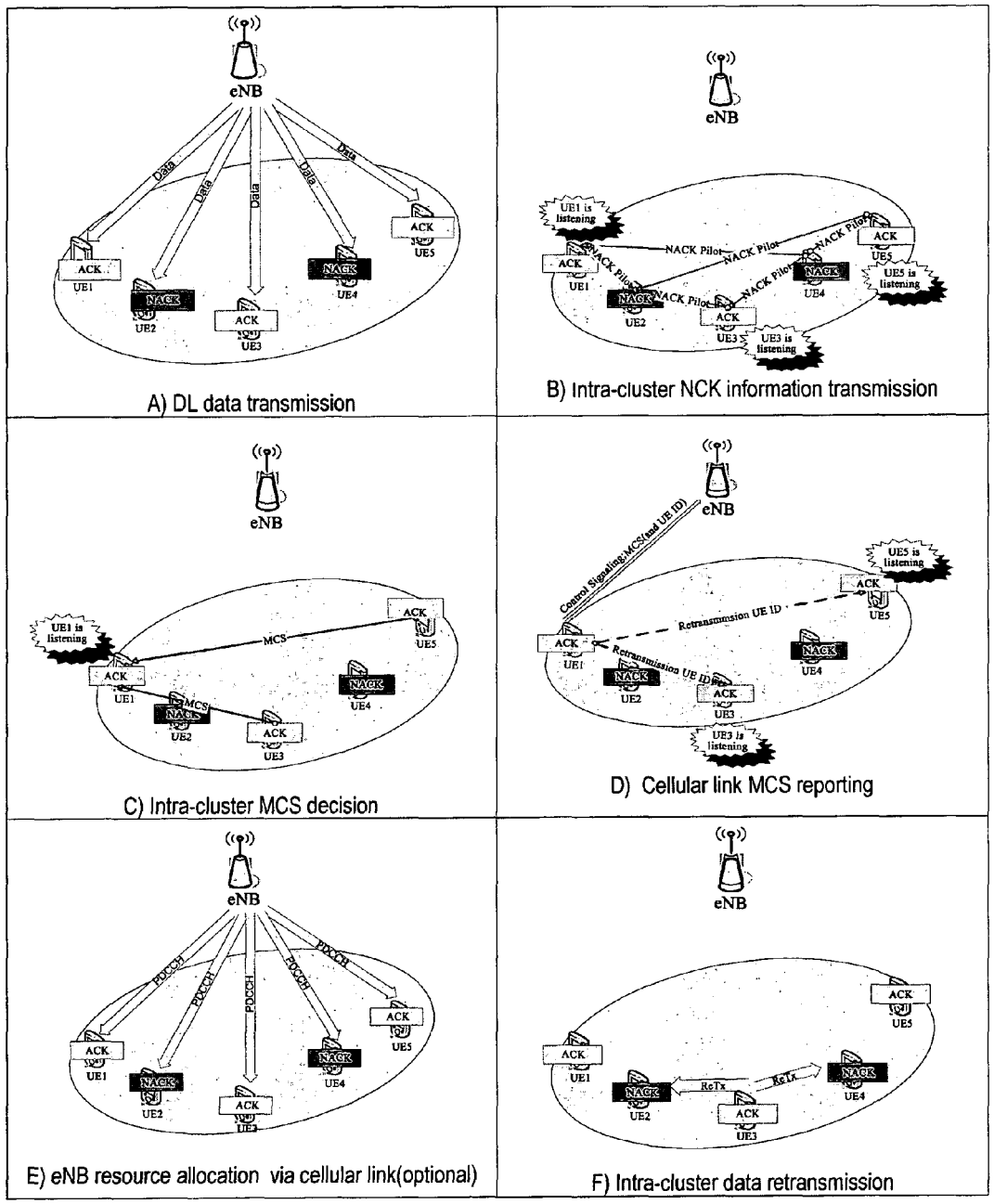
FIG. 6 shows schematically implementation of Scheme B for local selection of a retransmitting UE in a cluster in accordance with embodiments of the present invention.

FIG. 6 shows schematically implementation of Scheme B for local selection of a retransmitting UE in a cluster in accordance with an embodiment of the present invention. Similarly, FIG. 6 only shows an example of a system with one eNB and five UEs. As mentioned above, the present invention can also be applicable to a system with more eNB and more UEs. A short description on Scheme B is summarized below as implementation example.

Similarly, the eNB may send a data packet to all the UEs within the cluster, as shown in block A) of FIG. 6. Then every UE detects the data packet and decides the ACK/NACK based on decision criteria, for example, CRC bits. If all the UEs can decode the data packet correctly, i.e. "all ACK", each ACK UE may wait for a pre-defined time interval and receive nothing. In this case, one ACK UE may report to the eNB with "a null MCS", and the eNB may then make a new transmission. If all the UEs decode the data packet incorrectly, i.e., "all NACK", the eNB may wait for a pre-defined time interval and receive nothing. Then, the eNB may make the retransmission of this data packet. If the data packet is decoded incorrectly at UE2 and UE4 and decoded correctly at UE1, UE3 and UE5, as shown in block B) of FIG. 6, UE2 and UE4 may send dedicated NACK information (or probing like signaling) to ACK UE1, UE3 and UE5.

After detecting/estimating the received NACK information, UE1, UE3 and UE5 may learn that UE2 and UE4 are NACK UEs. Then each ACK UE selects a MCS (for example, the worst MCS) for potential intra-cluster retransmission based on the pre-defined decision criteria. According to Scheme B, a pre-defined ACK device may be specified based at least in part on the pre-ordering within the D2D cluster. For example, according to the pre-ordering within the D2D cluster, a D2D UE is aware of its order within the cluster after receiving NACK UE's broadcasting signal. Therefore the receiving ACK UE can be pre-defined dynamically. In the example of FIG. 6, according to the pre-ordering within the cluster, UE3 and UE5 respectively send their own MCS (for example, the worst MCS) to UE1, as shown in block C) of FIG. 6. After UE1 collects all the MCSs, UE1 can make a decision about which UE may make retransmission within the cluster, and report the relevant information to the eNB via a cellular link. All the rest of UEs are listening, as shown in block D) of FIG. 6. According an exemplary embodiment, UE1 may select the best MCS among three MCSs (one is its own, and two from UE3 and UE5 respectively), and specify one or more retransmitting UEs based at least in part on the final selected MCS.

An example with respect to the selection of a retransmitter is presented here. UE1 may detect a NACK signal from UE2 and UE4 and obtain QPSK (Quadrature Phase Shift Keying) for UE2 and 16 QAM (Quadrature Amplitude Modulation) for UE4; UE3 may detect a NACK signal from UE2 and UE4 and obtain 16 QAM for UE2 and 64 QAM for UE4, and thus UE3 may report worst MCS (16 QAM) to UE1. Similarly, UE5 may detect a NACK signal from UE2 and UE4 and obtain BPSK (Binary Phase Shift Keying) for UE2 and QPSK for UE4, and thus UE5 may report worst MCS (BPSK) to UE1. After receiving 16 QAM from UE3 and BPSK from UE5, UE1 (UE1's own worst MCS is QPSK) may determine 16 QAM is the best one among its received MCSs, and decide that UE3 would retransmitting the missed packet with 16 QAM. In this example, the respective worst MCSs from ACK UEs are different, there is only one retransmitter UE3. On the other hand, if the worst MCSs from UE1, UE3 and UE5 are QPSK, 16 QAM and 16 QAM, respectively, then multiple retransmitters (UE3 and UE5) might occur without explicit ID. Alternatively, for the case that the final MCS corresponds to multiple retransmitters (UE3 and UE5), UE1 may specify one of UE3 and UE5 as the retransmitter according to a pre-determined criterion, for example, according to their pre-defined ordering ID.

There could be several options to design the cellular uplink signaling from the resource efficiency and power efficiency point of view. As described previously, for Option 1, UE1 may send only the final MCS to the eNB, and for example, if UE3 and UE5 have the same MCS, then both UE3 and UE5 are the retransmitters within the cluster. For Option 2, UE1 may send the final MCS and UE3's pre-ordering ID to the eNB (assuming that UE3 is determined as the retransmitter by UE1), and UE3 is the only retransmitter within the cluster (preferred power saving mode). For Option 3, UE1 sends only the final MCS to the eNB, and sends the UE3's pre-ordering ID within the cluster (assuming that UE3 is determined as the retransmitter by UE1), then UE3 is the only retransmitter within the cluster (preferred power saving mode).

For example, if the radio resource for the D2D communication has been reserved by the eNB, UE1 may send only an intra-retransmission indicator to the eNB and the retransmission will occur within the cluster (as shown in block F) of FIG. 6). In an exemplary embodiment, the intra-retransmission indicator can be only 1 bit indicator or implicitly indicated by the MCS as in Option 1. Optionally, the eNB may make the proper scheduling based on all the available information and send the scheduling grant in the downlink (DL) control channel such as Physical Downlink Control Channel (PDCCH), as shown in block E) of FIG. 6. Depending on the decision made by UE1, there may be one ACK UE (such as UE3) or more ACK UEs (such as UE3+UE5) making the retransmission within the cluster.

An advantage of the above solution is that the selection of retransmitting ACK devices is done locally within the cluster without involvement of the eNB for evaluating the channel qualities between cluster devices and the selection process. In addition, the indication information from the cluster about on-going retransmission process only requires low overhead.

The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
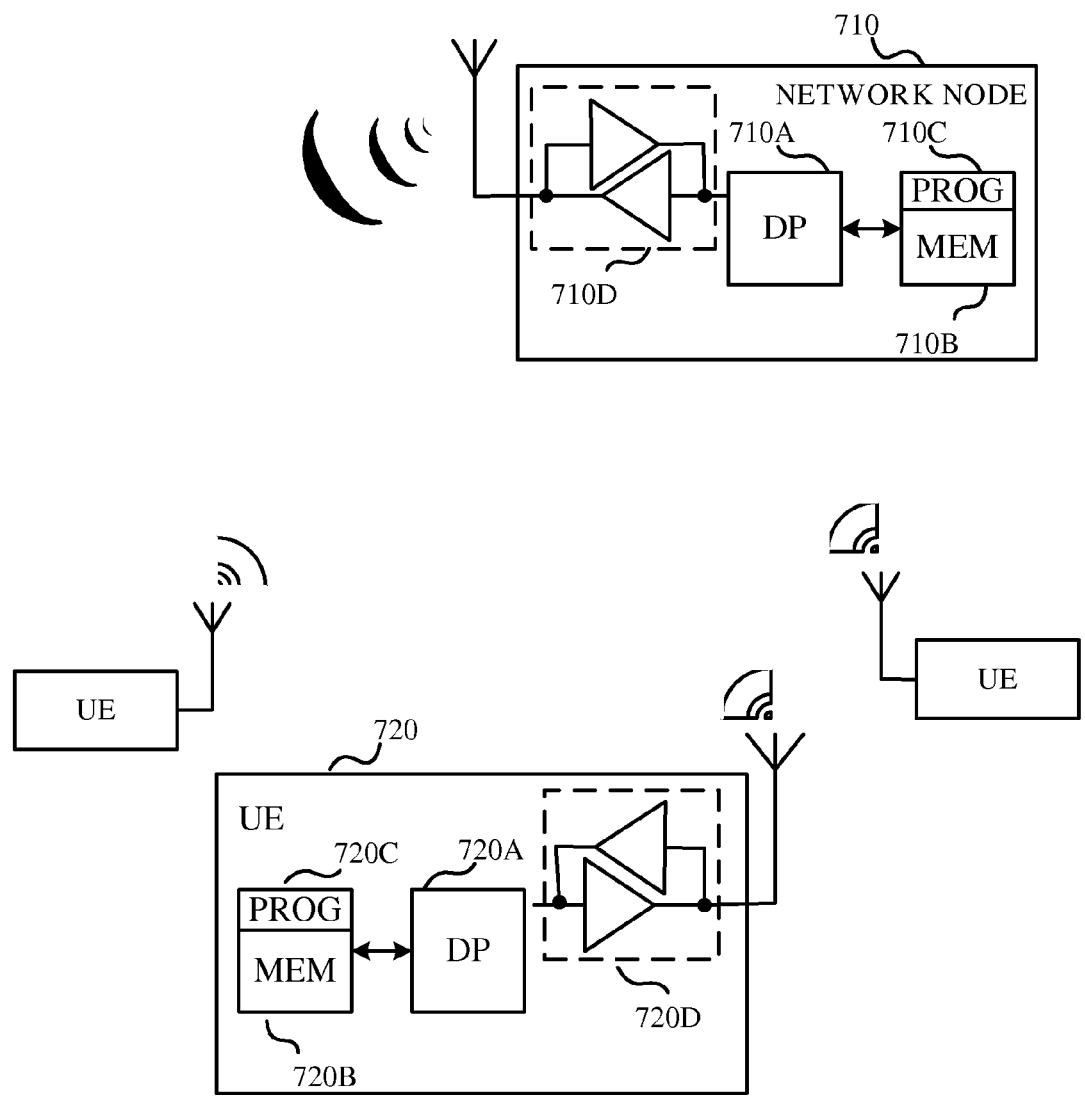
FIG. 7 is a simplified block diagram of various devices which are suitable for use in practicing exemplary embodiments of the present invention.

Now reference is made to FIG. 7 illustrating a simplified block diagram of various devices which are suitable for use in practicing exemplary embodiments of the present invention. In FIG. 7, a network node 710 such as a BS/eNB/AP/control center may be adapted for communicating with one or more UEs (denoted as UE 720 in general). In an exemplary embodiment, the network node 710 may comprise a data processor (DP) 710A, a memory (MEM) 710B that stores a program (PROG) 710C, and a suitable radio frequency (RF) transceiver 710D for communicating with an UE (such as UE 720) via one or more antennas. For example, the transceiver 710D in the network node 710 may be an integrated component for transmitting and/or receiving signals and messages. Alternatively, the transceiver 710D may comprise separate components to support transmitting and receiving signals/messages, respectively. The DP 710A may be used for processing these signals and messages. Alternatively or additionally, the network node 710 may comprise various means and/or components for implementing functions of the foregoing steps and methods in FIG. 4.

According to an exemplary embodiment, the UE 720 may also comprise a DP 720A, a MEM 720B that stores a PROG 720C, and a suitable RF transceiver 720D. The transceiver 720D in the UE 720 can be used for communicating with a network node (such as the network node 710) and/or another UE within a cluster. For example, the transceiver 720D may be an integrated component for transmitting and/or receiving signals and messages. Alternatively, the transceiver 720D may comprise separate components to support transmitting and receiving signals/messages, respectively. The DP 720A may be used for processing these signals and messages. According to another exemplary embodiment, the UE 720, such as a mobile device, a wireless terminal, a portable computer or the like, may comprise various means and/or components for implementing functions of the foregoing steps and methods in FIG. 2 and FIG. 3.

At least one of the PROGs 710C, 720C is assumed to comprise program instructions that, when executed by the associated DP, enable the electronic device to operate in accordance with the exemplary embodiments, as discussed above. That is, the exemplary embodiments of the present invention may be implemented at least in part by computer software executable by the DP 710A of the network node 710 and by the DP 720A of the UE 720, or by hardware, or by a combination of software and hardware. The basic structure and operation of the network node 710 and the UE 720 are known to one skilled in the art.

The MEMs 710B and 720B may be of any type suitable to the local technical environment and may be implemented using any suitable data storage technology, such as semiconductor based memory devices, flash memory, magnetic memory devices and systems, optical memory devices and systems, fixed memory and removable memory. The DPs 710A and 720A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A method comprising:
   selecting first retransmission indication information according to a first pre-defined criterion, in response to receipt of non-acknowledgement information from at least one non-acknowledgement user equipment at which a data packet from a network node is decoded incorrectly;
   performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:

transmitting the first retransmission indication information to the at least one non-acknowledgement user equipment; and receiving second retransmission indication information from each of the at least one non-acknowledgement user equipment, wherein the second retransmission indication information is selected according to a second pre-defined criterion by the at least one non-acknowledgement user equipment among respective retransmission indication information received from the at least one acknowledgement user equipment, and wherein the respective retransmission indication information comprising the first retransmission indication information is selected by the at least one acknowledgement user equipment according to the first pre-defined criterion; and determining, based at least in part on the local selection of the retransmitting user equipment, whether or not to retransmit the data packet to the at least one non-acknowledgement user equipment.

2. The method according to claim 1, wherein said determining equipment based at least in part on the local selection of the retransmitting user equipment comprises:

determining to retransmit the data packet to the at least one non-acknowledgement user equipment, if the first retransmission indication information matches with the second retransmission indication information.

3. The method according to claim 1, wherein the retransmission decision comprises at least an identifier of the retransmitting user equipment.

4. The method according to claim 1, wherein for each of the at least one acknowledgement user equipment, the respective retransmission indication information comprises the worst one of channel quality metrics evaluated for all of the at least one non-acknowledgement user equipment, and wherein the second retransmission indication information comprises the best one of said worst channel quality metrics.

5. A method comprising:

selecting first retransmission indication information according to a first pre-defined criterion, in response to receipt of non-acknowledgement information from at least one non-acknowledgement user equipment at which a data packet from a network node is decoded incorrectly;

performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:

collecting, as a pre-defined acknowledgement user equipment, respective retransmission indication information from the at least one acknowledgement user equipment, wherein the respective retransmission indication information comprising the first retransmission indication information is selected by the at least one acknowledgement user equipment according to the first pre-defined criterion, selecting second retransmission indication information among the respective retransmission indication information, according to a second pre-defined criterion, and reporting the second retransmission indication information to the network node, wherein the at least one acknowledgement user equipment, at which the selected retransmission indication information according to the first pre-defined criterion matches with the second retransmission indication information, is the retransmitting user equipment; and determining, based at least in part on the local selection of the retransmitting user equipment, based at least in part on the local selection of the retransmitting user equipment, whether or not to retransmit the data packet to the at least one non-acknowledgement user equipment.

6. A method comprising:

selecting first retransmission indication information according to a first pre-defined criterion, in response to receipt of non-acknowledgement information from at least one non-acknowledgement user equipment at which a data packet from a network node is decoded incorrectly;

performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:

sending the first retransmission indication information to a pre-defined acknowledgement user equipment, and listening for a retransmission decision signaled by the pre-defined acknowledgement user equipment, wherein the pre-defined acknowledgement user equipment collects respective retransmission indication information from the at least one acknowledgement user equipment, wherein the respective retransmission indication information comprising the first retransmission indication information is selected by the at least one acknowledgement user equipment according to the first pre-defined criterion; and determining, based at least in part on the local selection of the retransmitting user equipment, whether or not to retransmit the data packet to the at least one non-acknowledgement user equipment.

7. An apparatus, comprising:

at least one processor; and at least one memory including computer program code, the at least one memory and the computer program code configured to, with the at least one processor, cause the apparatus to perform at least the following:

select first retransmission indication information according to a first pre-defined criterion, in response to receipt of non-acknowledgement information from at least one non-acknowledgement user equipment at which a data packet from a network node is decoded incorrectly;

perform a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:

transmit the first retransmission indication information to the at least one non-acknowledgement user equipment; and receive second retransmission indication information from each of the at least one non-acknowledgement user equipment, wherein the second retransmission indication information is selected according to a second pre-defined criterion by the at least one non-acknowledgement user equipment among respective retransmission indication information received from the at least one acknowledgement user equipment, and wherein the respective retransmission indication information comprising the first retransmission indication information is selected by the at least one acknowledgement user equipment according to the first pre-defined criterion; and determine, based at least in part on the local selection of the retransmitting user equipment, whether or not to retransmit the data packet to the at least one non-acknowledgement user equipment.

8. The apparatus according to claim 7, wherein said apparatus is further configured to at least to at least perform the local selection of the retransmitting user equipment within the cluster by at least transmit the first retransmission indication information to the at least one non-acknowledgement user equipment; and receive second retransmission indication information from each of the at least one non-acknowledgement user equipment, wherein the second retransmission indication information is selected according to a second pre-defined criterion by the non-acknowledgement user equipment among respective retransmission indication information received from the at least one acknowledgement user equipment, and wherein the respective retransmission indication information comprising the first retransmission indication information is selected by the at least one acknowledgement user equipment according to the first pre-defined criterion.

9. The apparatus according to claim 8, wherein for each of the at least one acknowledgement user equipment, the respective retransmission indication information comprises the worst one of channel quality metrics evaluated for all of the at least one non-acknowledgement user equipment, and wherein the second retransmission indication information comprises the best one of said worst channel quality metrics.

10. The apparatus according to claim 8, wherein said apparatus is further configured to at least to at least determine whether or not to retransmit the data packet to the at least one non-acknowledgement user equipment by at least:

determine to retransmit the data packet to the at least one non-acknowledgement user equipment, if the first retransmission indication information matches with the second retransmission indication information.

11. The apparatus according to claim 7, wherein said apparatus is further configured to at least to at least perform the local selection of the retransmitting user equipment within the cluster by at least:

collect, as a pre-defined acknowledgement user equipment, respective retransmission indication information from the at least one acknowledgement user equipment, wherein the respective retransmission indication information comprising the first retransmission indication information is selected by the at least one acknowledgement user equipment according to the first pre-defined criterion;

select second retransmission indication information among the respective retransmission indication information, according to a second pre-defined criterion; and report the second retransmission indication information to the network node, wherein an acknowledgement user equipment of which the selected retransmission indication information according to the first pre-defined criterion matches with the second retransmission indication information is the retransmitting user equipment.

12. The apparatus according to claim 7, wherein said apparatus is further configured to at least to at least perform the local selection of the retransmitting user equipment within the cluster by at least:

send the first retransmission indication information to a pre-defined acknowledgement user equipment; and listen for a retransmission decision signaled by the pre-defined acknowledgement user equipment, wherein the pre-defined acknowledgement user equipment collects respective retransmission indication information from the at least one acknowledgement user equipment, and wherein the respective retransmission indication information comprising the first retransmission indication information is selected by the at least one acknowledgement user equipment according to the first pre-defined criterion.

13. The apparatus according to claim 12, wherein the retransmission decision comprises at least an identifier of the retransmitting user equipment.

14. A non-transitory computer program product comprising a non-transitory computer-readable medium encoded with instructions that, when executed by at least one processor, perform at least the following:

selecting first retransmission indication information according to a first pre-defined criterion, in response to receipt of non-acknowledgement information from at least one non-acknowledgement user equipment at which a data packet from a network node is decoded incorrectly;

performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:

transmitting the first retransmission indication information to the at least one non-acknowledgement user equipment; and receiving second retransmission indication information from each of the at least one non-acknowledgement user equipment, wherein the second retransmission indication information is selected according to a second pre-defined criterion by the at least one non-acknowledgement user equipment among respective retransmission indication information received from the at least one acknowledgement user equipment, and wherein the respective retransmission indication information comprising the first retransmission indication information is selected by the at least one acknowledgement user equipment according to the first pre-defined criterion; and determining, based at least in part on the local selection of the retransmitting user equipment, whether or not to retransmit the data packet to the at least one non-acknowledgement user equipment.

15. An apparatus, comprising:
at least one processor; and
at least one memory including computer program code,
the at least one memory and the computer program code configured to, with the at least one processor, cause the apparatus to perform at least the following:
select first retransmission indication information according to a first pre-defined criterion, in response to receipt of non-acknowledgement information from at least one non-acknowledgement user equipment at which a data packet from a network node is decoded incorrectly;
perform a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:
collect, as a pre-defined acknowledgement user equipment, respective retransmission indication information from the at least one acknowledgement user equipment, wherein the respective retransmission indication information comprising the first retransmission indication information is selected by the at least one acknowledgement user equipment according to the first pre-defined criterion,
select second retransmission indication information among the respective retransmission indication information, according to a second pre-defined criterion, and
report the second retransmission indication information to the network node, wherein the at least one acknowledgement user equipment, at which the selected retransmission indication information according to the first pre-defined criterion matches with the second retransmission indication information, is the retransmitting user equipment; and
determine, based at least in part on the local selection of the retransmitting user equipment, based at least in part on the local selection of the retransmitting user equipment, whether or not to retransmit the data packet to the at least one non-acknowledgement user equipment.

16. A non-transitory computer program product comprising a non-transitory computer-readable medium encoded with instructions that, when executed by at least one processor, perform at least the following:
selecting first retransmission indication information according to a first pre-defined criterion, in response to receipt of non-acknowledgement information from at least one non-acknowledgement user equipment at which a data packet from a network node is decoded incorrectly;
performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly,
wherein said performing the local selection of the retransmitting user equipment within the cluster comprises:
collecting, as a pre-defined acknowledgement user equipment, respective retransmission indication information from the at least one acknowledgement user equipment, wherein the respective retransmission indication information comprising the first retransmission indication information is selected by the at least one acknowledgement user equipment according to the first pre-defined criterion,
selecting second retransmission indication information among the respective retransmission indication information, according to a second pre-defined criterion, and
reporting the second retransmission indication information to the network node, wherein the at least one acknowledgement user equipment, at which the selected retransmission indication information according to the first pre-defined criterion matches with the second retransmission indication information, is the retransmitting user equipment; and
determining, based at least in part on the local selection of the retransmitting user equipment, based at least in part on the local selection of the retransmitting user equipment, whether or not to retransmit the data packet to the at least one non-acknowledgement user equipment.

17. An apparatus, comprising:
at least one processor; and
at least one memory including computer program code,
the at least one memory and the computer program code configured to, with the at least one processor, cause the apparatus to perform at least the following:
select first retransmission indication information according to a first pre-defined criterion, in response to receipt of non-acknowledgement information from at least one non-acknowledgement user equipment at which a data packet from a network node is decoded incorrectly;
perform a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:
send the first retransmission indication information to a pre-defined acknowledgement user equipment, and
listen for a retransmission decision signaled by the pre-defined acknowledgement user equipment,
wherein the pre-defined acknowledgement user equipment collects respective retransmission indication information from the at least one acknowledgement user equipment,
wherein the respective retransmission indication information comprising the first retransmission indication information is selected by the at least one acknowledgement user equipment according to the first pre-defined criterion; and
determine, based at least in part on the local selection of the retransmitting user equipment, whether or not to retransmit the data packet to the at least one non-acknowledgement user equipment.

18. A non-transitory computer program product comprising a non-transitory computer-readable medium encoded with instructions that, when executed by at least one processor, perform at least the following:

selecting first retransmission indication information according to a first pre-defined criterion, in response to receipt of non-acknowledgement information from at least one non-acknowledgement user equipment at which a data packet from a network node is decoded incorrectly;

performing a local selection of a retransmitting user equipment within a cluster based at least in part on the first retransmission indication information, wherein the cluster comprises the at least one non-acknowledgement user equipment, and at least one acknowledgement user equipment at which the data packet is decoded correctly, wherein said performing the local selection of the retransmitting user equipment within the cluster comprises:

sending the first retransmission indication information to a pre-defined acknowledgement user equipment, and listening for a retransmission decision signaled by the pre-defined acknowledgement user equipment, wherein the pre-defined acknowledgement user equipment collects respective retransmission indication information from the at least one acknowledgement user equipment, wherein the respective retransmission indication information comprising the first retransmission indication information is selected by the at least one acknowledgement user equipment according to the first pre-defined criterion; and determining, based at least in part on the local selection of the retransmitting user equipment, whether or not to retransmit the data packet to the at least one non-acknowledgement user equipment.

* * * * *